United States Patent [19]
Daughterty, III

[11] Patent Number: 5,557,517
[45] Date of Patent: Sep. 17, 1996

[54] SYSTEM AND METHOD FOR DETERMINING THE PRICE OF AN EXPIRATIONLESS AMERICAN OPTION AND ISSUING A BUY OR SELL TICKET ON THE CURRENT PRICE AND PORTFOLIO

[76] Inventor: Vergil L. Daughterty, III, 2963 Victoria Cir., Macon, Ga. 31204-1253

[21] Appl. No.: 282,717

[22] Filed: Jul. 29, 1994

[51] Int. Cl.$^6$ ................................................. G06F 157/00
[52] U.S. Cl. ............................................................ 364/408
[58] Field of Search ................................... 364/401, 408; 395/925; 340/825.26, 825.27

[56] References Cited

U.S. PATENT DOCUMENTS

| | | | |
|---|---|---|---|
| 4,597,046 | 6/1986 | Musmanno et al. | 364/408 |
| 4,674,044 | 6/1987 | Kalmus et al. | 364/408 |
| 4,766,539 | 8/1988 | Fox | 364/401 |
| 4,774,663 | 9/1988 | Musmanno et al. | 364/408 |
| 4,823,265 | 4/1989 | Nelson | 364/408 |
| 5,083,782 | 1/1992 | Nilssen | 273/138 |
| 5,101,353 | 3/1992 | Lupien et al. | 364/408 |
| 5,132,899 | 6/1992 | Fox | 364/408 |

*Primary Examiner*—Donald E. McElheny, Jr.
*Attorney, Agent, or Firm*—Troutman Sanders; Joel S. Goldman; Scott M. Frank

[57] ABSTRACT

A system and method for determining the price of an expirationless American option over a broad variety of securities and issuing the correct bid and ask prices for the same. Data concerning initial margin requirements, contract value of the option, expiration date (if applicable) of the underlying security, number of contracts required, exchange fees, commission, residuals, and all open positions is accumulated and stored in computer memory. When it is desired that an option be bought or sold, information identifying the contract C the type of option, either call or put, the current price of the underlying security S, the exercise price X, the margin requirement and type, either M for a dollar amount and the unit price movement of the security U, or G for a percentage amount, is entered into the computer which is actuated to calculate the price of the option as M or G multiplied by X when S=X, or as M+U(S–X) for M margin requirements and as SG+G(S–X) for G margin requirements for call options. Put options are calculated as M+U(X–S) for M margin requirements and as SG+G(X–S) for G margin requirements. The results of the calculations are outputted to a printer, display or memory storage device.

5 Claims, 1 Drawing Sheet

SYSTEM AND METHOD FOR DETERMINING THE PRICE OF AN EXPIRATIONLESS AMERICAN OPTION AND ISSUING A BUY OR SELL TICKET ON THE CURRENT PRICE AND PORTFOLIO

FIELD OF THE INVENTION

The present invention provides a system and method for determining the price of an expirationless American option of a security and issuing a buy or sell ticket on the current price and portfolio.

BACKGROUND OF THE INVENTION

The present invention relates to options on securities which are bought and sold on regulated exchanges around the world. Ownership of a "call" option gives the purchaser the right, but not the obligation, to buy a particular security at an established price (the "strike price" or the "exercise price"). Ownership of a "put" option gives the purchaser the right, but not the obligation, to sell a particular security (called the underlying security) at the strike price. The sellers of both the put and the call are obligated to perform the transaction if demanded by the purchaser of the option. This performance is guaranteed by the posting of a performance bond (the "margin requirement"). In addition to the two types of options (put and call), there are two distinct classes of options (both puts and calls): the "American option" and the "European option." The purchaser of the American option may exercise the option (i.e., choose to buy/sell at the strike price) at any point prior to the expiration of the life of the option. The purchaser of the European option may exercise the option only at its expiration date. For either option type, if exercise is possible, the option is said to be "in-the-money" or "intrinsic," otherwise it is "out-of-the-money" or "extrinsic." The expiration dates of exchange-traded options are standardized and the same option contract may be bought or sold at any point prior to expiration. An investor who purchases an option (put or call) is said to "long" the option and holding a "long call" or "long put." An investor who sells an option (put or call) is said to "short" the option and holding a "short call" or "short put."

Options as a means of hedging risk are of increasing interest not just to speculators and small investors, but also to insurance and mortgage companies, banks, credit unions, farmers and other commodity producers such as mining companies, oil companies, and manufacturing companies whose revenue depends heavily upon the floating price of a commodity in the market place. Insurance companies can hedge against a change in the yield curve, or the cost of money over different time horizons. Banks and credit unions can protect themselves from unanticipated loan prepayments if interest rates fall precipitously. Commodity producers which have a significant investment and lead time from production to market can hedge against an unanticipated drop in prices. Manufacturers of all types, from electronics to cereals, can protect themselves from an increase in the price of a key production items, such as gold or oats.

In the current marketplace for risk management, producers have the choice of two risky and inferior alternatives. The first is a margin or futures position which will offset not only the damage of unanticipated price changes, but will also offset the rewards if prices move in their favor. It is also only available at the current security price. While the point-for-point movement does allow an almost zero-sum game, it has the unpleasant side effect of the monetary risk not being limited to the original premium payment and commission. Given a sustained movement in price in a direction which would normally be considered favorable, the individual or company is forced to replenish funds in the futures or margin account or have the position closed, forcing unanticipated cash flow pressures or the loss of the risk insurance. The second alternative is an option position which, though the risk is limited to the premium and commission, is of limited lifespan. If prices are stable over the period against which the individual or company wishes to hedge, they are forced to continually pay additional monies to insure against loss, or face the loss of the risk insurance. Additionally, because ephemeral, or short-lived, options are a contingent claim, the option may not move point-for-point with the underlying security, resulting in a loss that is not insured. This invention maintains the advantages of both alternatives without the disadvantages. An expirationless American option moves approximately point-for-point within the relevant range, but need not be used until needed, allowing the purchaser to hedge risk over an extended period of time. Furthermore, it has the property of limited liability, so that the maximum loss incurred (if any) is the option premium and commission. Because it is available at prices other than the current security price, it is possible to maximally hedge against loss while maintaining most of the positive effect from a beneficial move in the price of the underlying security.

The calculation of the price of the option must be efficient with respect to prices within the market and minimize the probability of an arbitrage (riskless) profit. This price must be based on the conditions under which it would be exercised or sold, and provide for an efficient market for these securities.

For example, current information on margin requirements for all securities and markets is available on a daily basis from the respective exchange. It is also possible to receive current quotations on the price of a security through a variety of sources, e.g., from cable TV equipped with special decoders to satellite transmissions. It is expected that the available exercise prices would be established by the exchange and would match the exercise prices for ephemeral options that already are traded; however, an expirationless American option can be sold at any rational price. Clearly, given the constant change in the current prices of securities, the vast number of applicable securities for expirationless American options, the differing margin requirements demanded by the exchanges as well as the record keeping requirements, prompt information and calculation of correct prices and portfolio tracking is only available through computerization.

SUMMARY OF THE INVENTION

The present invention provides a system and method for determining the pure price for an expirationless American option (henceforth, eAO), and can include calculation of commission rates, residuals and exchange fees. One of ordinary skill in the securities industry understands that pure price means the price of a security excluding transaction fees, such as commissions and administrative fees. Specifically, given a contract C, the pure price P can be calculated for an eAO at an exercise price X given a security price S and a margin requirement of G (for percentage denominated margin requirements) or M with unit price movement U (for dollar denominated margin requirements).

In accordance with the present invention, data concerning margin requirements for a particular contract C are entered into a computer, and constant updates concerning the security prices S are likewise entered into the computer. Given a particular exercise price X at which the investor wishes to open an option position and the type of eAO the investor wishes to purchase (whether put or call), the computer is first actuated to determine the type of margin requirement, whether M or G, and then to calculate eAO=M+U(S−X) for call options and eAO=M+U(X−S) for put options where the margin requirement is a dollar amount M; if the margin requirement is a percentage G, then the computer calculates eAO=SG+G(S−X) for calls and eAO=SG+G(X−S) for puts. This information is then stored as an open position in the computer memory. Optionally, the exchange rates, commission and residuals may be added to the pure price to determine the market price. The computer is then actuated to generate a report. For example, the computer can instruct the printing device to print the purchase or sell ticket for a phone or facsimile machine order or, if used on the floor of the respective exchange, for distribution to a runner to enter the order in open out-cry or with a market maker. Alternatively, the report may be displayed on a monitor, outputted to a memory storage device or transmitted by a signal to a remote receiving device.

Accordingly, it is a principal object of the present invention to provide a system and method for generating a report containing the pure price of an eAO calculated from given a set of data entered into a computer.

BRIEF DESCRIPTION OF THE DRAWING

These and other aspects and advantages of the present invention are more apparent in the following detailed description and claims, particularly when considered in conjunction with the accompanying FIG. 1 which is a block diagram of a preferred embodiment of a system in accordance with the present invention.

DETAILED DESCRIPTION OF THE INVENTION

Figure 1:
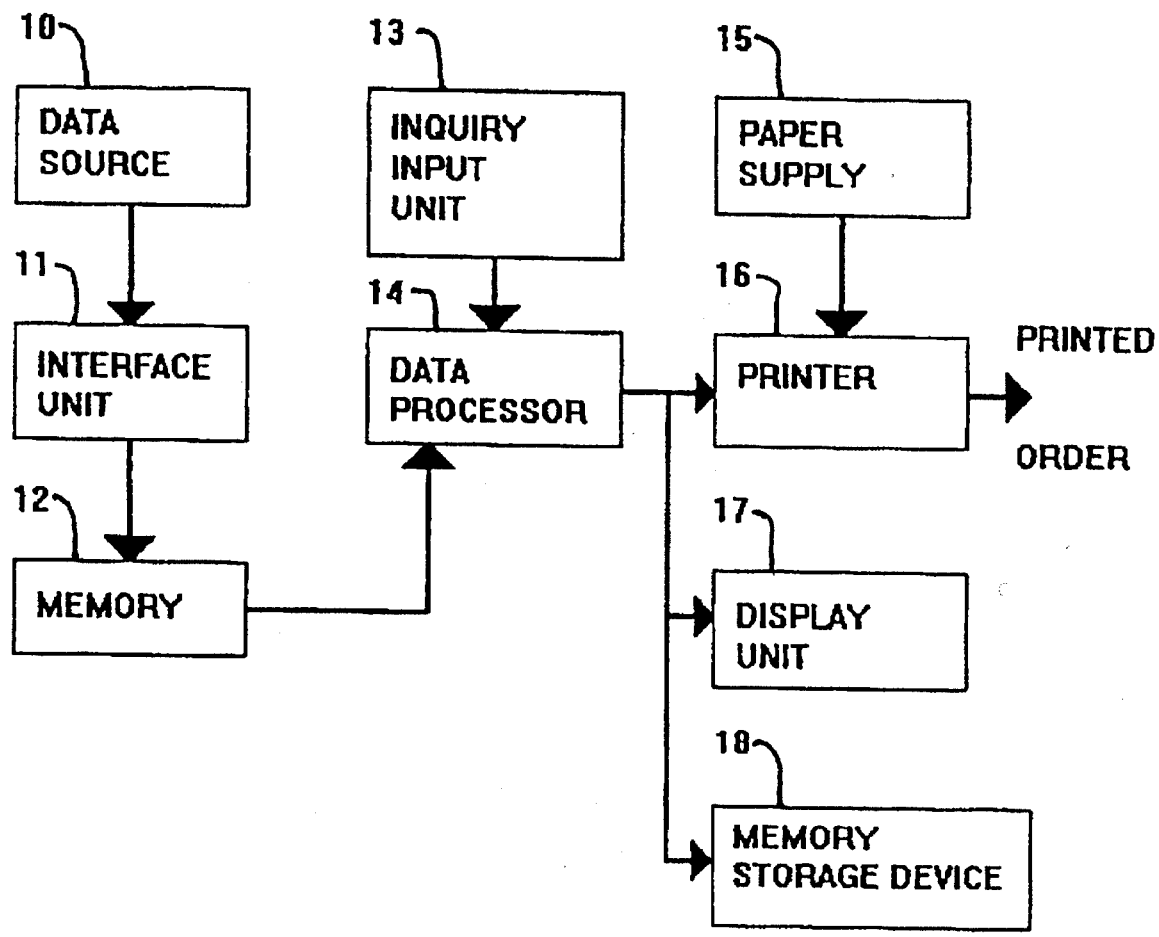

The following symbols and meanings will be used in the present discussion:

KEY TO SYMBOLS:

| | |
|---|---|
| eAO = | expirationless American option |
| X = | exercise price |
| S = | security price |
| G = | margin requirement (for percentage dominated margin requirements) |
| M = | margin requirement (for dollar dominated margin requirements) |
| U = | unit price movement |
| C = | contract |
| P = | pure price |
| N = | number of options desired |
| T = | time until expiration |

In a system in accordance with the present invention as depicted in FIG. 1, data source 10 applies data through interface unit 11 to memory 12 of a data processor 14 which contains the type and amount of margin requirements M or G for respective contracts C and current security prices S as acquired and updated through an external data source 10. The data processor 14 can be a personal computer or other computing device capable of applying a formula to a set of data.

The external data source 10 can be a quotation system, either by satellite transmission or land line, containing information on current security prices, margin requirements and other necessary information available as off-the-shelf equipment from a variety of sources, such as Quotron™. Such systems can be used directly as input to memory 12, and so these systems would constitute inquiry input unit 13 and interface unit 11. Interface unit 11 accumulates data regarding security prices and margin requirements and inputs the data to memory 12 as needed.

The margin requirement M or G is typically obtained from an external database. Since every security has a specific margin requirement set by the specific stock exchange, a database of current margin requirements is interrogated by the data processor 14, which acquires the data represented by the margin requirements M or G and the unit price movement U. This database is updated as required by the exchange to maintain current information When it is desired to purchase or sell an eAO in some security at a particular exercise price X, information identifying the number of options desired N, the underlying contract C, the exercise price X, the security price S, the type of margin requirement M or G and the unit price movement U is entered to the data processor 14 from inquiry input unit 13, such as a keyboard. The information stored in memory 12 is available to data processor 14, and so data processor 14 determines the pure option price P according to the calculations described hereinbelow, which can include additional information such as exchange fees, commissions and residuals if desired. Data processor 14 then displays the pure price P on display unit 17. Alternatively, or additionally, the option premium and other relevant information can be applied by data processor 14 to printer 16 which receives paper from paper supply 15. Data processor 14 then causes printer 16 to print the buy or sell order, the type of option and the price of the option on that paper. The paper on paper supply 15 can be preprinted forms on which printer 16 prints in the blanks indicating the name or account number of the party to buy or sell the option, the party's current portfolio holdings, the option information, the buy/sell instructions and other such information. The printed form is then available to the party to execute the order and as a record that the order was executed and as a record copy to the purchaser/seller. Display unit 17 and inquiry input unit 13 can be a video display terminal and keyboard, respectively. Alternatively, the result may be displayed on a monitor or outputted to a memory storage device 18.

The calculations to be applied by the data processor 14 to the entered data are as follows:

for call options where the margin requirement is a dollar amount M: eAO=M+U(S−X);

for put options where the margin requirement is a dollar amount M: eAO=M+U(X−S);

for calls where the margin requirement is a percentage G: eAO=SG+G(S−X); and for puts where the margin requirement is a percentage G: eAO=SG+G(X−S).

For each option, the option premium is based upon the current security price S, the margin type and requirement M or G and the exercise price X. By way of example, if the underlying security is a stock whose margin requirement M is 25%, whose current price S is $50 and the desired exercise price X is $55 for a call, then the pure price P for a call option on a single share of stock is equal to SG+G(S−X)= 50(0.25)+(0.25)(50−55)=$11.25. If the option desired was a put, then the pure price P would be SG+G(X−S)=50(0.25)+

(0.25)(55−50)=$13.75. If the underlying security was an Standard & Poor's 500 futures with a margin requirement M of $10,000, a current price S of $450.00, exercise price X of $455.00, and a minimum price movement U of $5 per tick (0.01) or $500 per point (1.00), then the price P of a eAO call would be M+U(S−X)=10,000+500(450−455)=$8,500. If the desired option was a put, then the price P of an eAO put option would be M+U(X−S)=10,000+500(455−450)=$12,500.

A method according to the present invention comprises the steps of (a) acquiring customer or account identification which is to be credited with possession of the option position, the type of position, the type of eAO, the underlying security contract, the exercise price, the number of options; (b) entering the acquired identifications into the computer; (c) acquiring data containing information concerning the type of margin requirement for the underlying security as well as the unit price movement, and the current security price; (d) entering the acquired data in the computer; (e) actuating the computer to determine the pure price of the eAO using the formulas discussed hereinabove; and (f) actuating the computer to output the buy or sell ticket information at the calculated price to a medium.

Although the present invention has been described with reference to a particular embodiment, numerous modifications, rearrangements, and substitutions could be made, and still the result would be within the scope of the invention.

What is claimed is:

1. A data processing apparatus for use in transacting an expirationless American option (eAo) order for a security, said data processing apparatus comprising:

(a) a data source containing a set of data representative of a current market price for the security, an exercise price for the security and a margin requirement for the security;

(b) a memory storage operatively connected to said data source and adapted to store the set of data;

(c) an inquiry input unit for receiving a signal representative of a request to transact an eAo order for the security;

(d) means, responsive to the request signal and to the set of data, for generating data representative of a pure price for the eAo; and (e) means for outputting the pure price data of the eAo for use in transacting the eAo order.

2. The data processing apparatus of claim 1, wherein said data source is a Quotron system.

3. The data processing apparatus of claim 1, said inquiry input unit comprising a keyboard.

4. The data processing apparatus of claim 1, said output means comprising a video display unit.

5. The data processing apparatus of claim 1, said output means comprising a printer.

\* \* \* \* \*

UNITED STATES PATENT AND TRADEMARK OFFICE
CERTIFICATE OF CORRECTION

PATENT NO : 5,557,517
DATED : September 17, 1996
INVENTOR(S): Vergil L. Daughtery, III It is certified that error appears in the above-identified patent and that said Letters Patent are hereby corrected as shown below:

On the title page, items [19] and [76],
In the inventor's name in the title section of the patent, change "Daughterty, III" to --Daughtery, III--.

In the list of inventors, change "Vergil L. Daughterty, III" to --Vergil L. Daughtery, III--.

Signed and Sealed this

First Day of April, 1997

Attest:

Attesting Officer

BRUCE LEHMAN

Commissioner of Patents and Trademarks